(No Model.)
S. A. MILTON.
PERCOLATOR FOR COFFEE POTS.
No. 335,946. Patented Feb. 9, 1886.
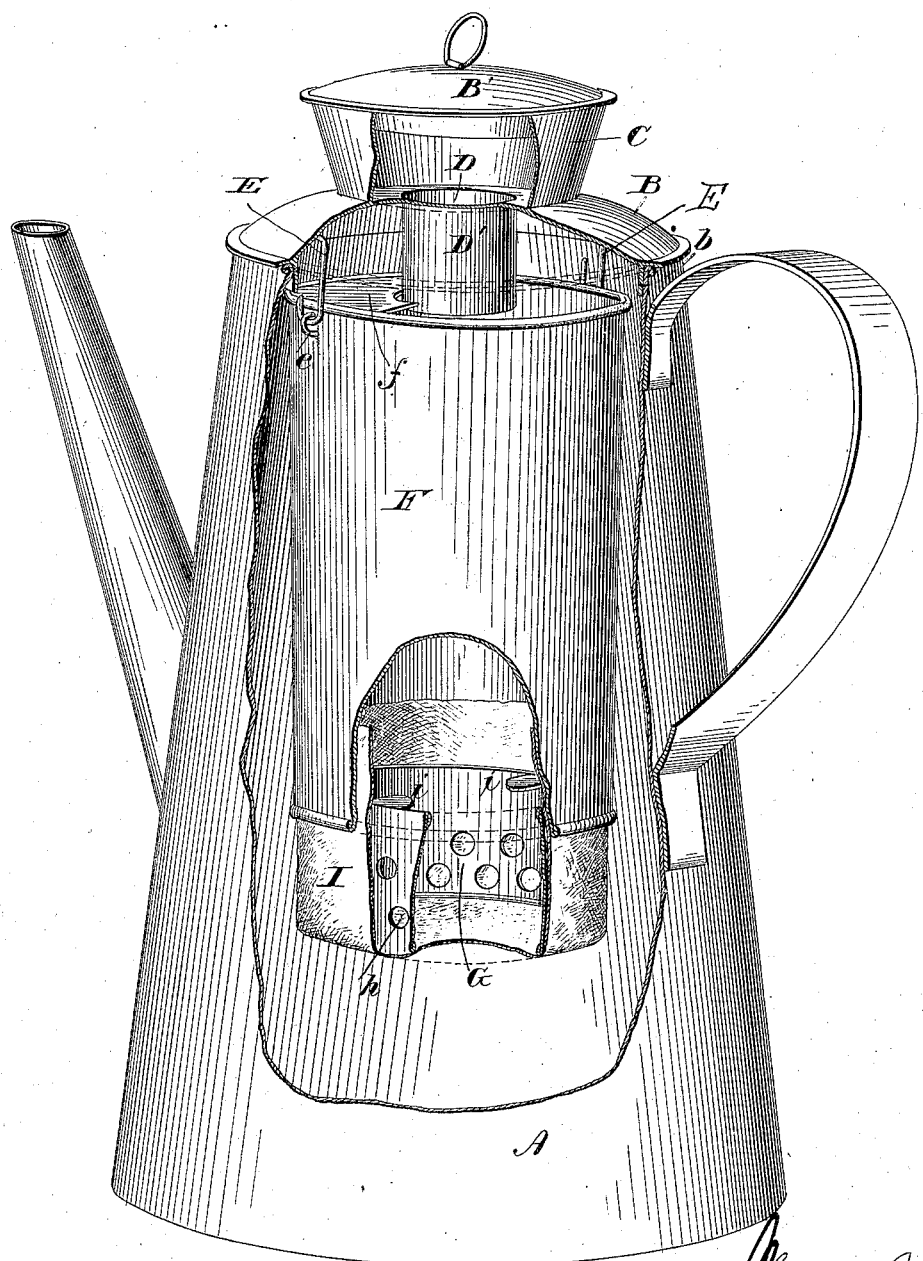
WITNESSES

UNITED STATES PATENT OFFICE.

SAMUEL A. MILTON, OF CLINTON, MISSOURI.

PERCOLATOR FOR COFFEE-POTS.

SPECIFICATION forming part of Letters Patent No. 335,946, dated February 9, 1886.

Application filed June 11, 1885. Serial No. 168,382. (No model.)

*To all whom it may concern:*

Be it known that I, SAMUEL A. MILTON, a citizen of the United States of America, residing at Clinton, in the county of Henry and State of Missouri, have invented certain new and useful Improvements in Percolators for Coffee-Pots; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention is for a certain new and useful improvement in percolators or strainers for coffee-pots; and it consists in the construction and combination of the parts, as will be hereinafter fully set forth, and specifically pointed out in the claim.

In the accompanying drawing I have illustrated my invention by a perspective view, in which the parts are broken away so as to better illustrate the interior construction.

A represents a coffee-pot of ordinary construction, as shown, said coffee-pot being provided with a lid or cover, B, which is provided on its under side with downwardly-projecting flanges $b$, which fit into the upper edge of the coffee-pot. To the upper portion of the lid or cover B is attached a funnel or projecting portion, C, which is adapted to receive a supplemental lid, B'. Within the funnel C the lid is bent slightly downward and provided with an opening, D, which is surrounded on the under side of the lid by the upper edge of a depending flange, D', which flange or tube extends beyond the flange $b$. The parts of the lid B, with the exception of the supplemental cover B', are rigidly attached to each other. To the under side of the lid B, adjacent to the edges thereof, are rigidly secured depending hooks E, said hooks being adapted to engage with eyes $e$, which are secured to the outer edges of a conical receptacle, F. The receptacle F may be provided with a half-lid, $f$, the center portion of which is cut away so that it will lie against the tube D', attached to the lid.

The conical receptacle F, hereinbefore described, is adapted to receive a band, G, which tapers lengthwise, the diameter of the upper portion of the band being slightly larger than the lower diameter of the receptacle F, and said band is provided with a series of perforations, $h$, which extend around the same, and the upper edge of this band is provided with inwardly-projecting pieces $i$, which may be formed integral with or attached to said band. A cloth or strainer of textile fabric, I, is interposed between the receptacle F and the band, and is retained in position by the band G, and said strainer is adapted to cover the under portion and sides of the band.

When it is desired to make coffee, the parts forming my invention are moved from the coffee-pot and the half-lid is taken off the receptacle F. The cloth is then placed over the ring G, and said ring and strainer are inserted in the upper end of the portion F, and can be pressed by bearing upon the inwardly-projecting portions $i$ until the upper edge of said ring binds the inner edge of the receptacle F. The ground coffee is then placed in the receptacle F, and the half-lid placed upon the same, when it may be suspended or attached to the lid, so that said half-lid will be adjacent to the spout of the coffee-pot. The water is then poured upon the ground coffee and allowed to percolate through the coffee and strainer into the coffee-pot, and this water, or partially-made coffee, may be poured out of the spout and again pass through the percolator until the desired strength is obtained.

It will be readily seen from the construction hereinbefore described that when the coffee-pot proper is tilted the receptacle F will swing, so as to prevent the contents flowing over its upper edge, the half-cover $f$ preventing any possibility of such overflow.

I claim—

The combination, with the pot A, the cover B, having the hooks E, extension C, opening D, and tube D', and the supplemental lid B', of the inverted conical portion F, having ears $e$, the perforated conical band G, the straining fabric I, and the half-cover $f$, as described, and for the purposes set forth.

In testimony whereof I affix my signature in the presence of two witnesses.

SAMUEL A. MILTON.

Witnesses:
GEO. S. HOLLIDAY,
C. T. GIVENS.